(12) United States Patent
Ueda et al.

(10) Patent No.: US 9,962,900 B2
(45) Date of Patent: May 8, 2018

(54) LINING MATERIAL FOR CONDUIT AND LINING METHOD FOR CONDUIT

(71) Applicant: ASHIMORI INDUSTRY CO., LTD., Osaka-shi (JP)

(72) Inventors: Yasuhiro Ueda, Settsu (JP); Shinji Onishi, Settsu (JP); Shigeki Yamashita, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 177 days.

(21) Appl. No.: 14/650,148

(22) PCT Filed: Dec. 5, 2013

(86) PCT No.: PCT/JP2013/082659
§ 371 (c)(1),
(2) Date: Jun. 5, 2015

(87) PCT Pub. No.: WO2014/088053
PCT Pub. Date: Jun. 12, 2014

(65) Prior Publication Data
US 2015/0328857 A1    Nov. 19, 2015

(30) Foreign Application Priority Data

Dec. 7, 2012 (JP) ................................ 2012-268647

(51) Int. Cl.
*F16L 55/16* (2006.01)
*B32B 1/08* (2006.01)
(Continued)

(52) U.S. Cl.
CPC ............... *B32B 1/08* (2013.01); *B29C 63/36* (2013.01); *B32B 7/02* (2013.01); *F16L 55/165* (2013.01);
(Continued)

(58) Field of Classification Search
CPC ............... B32B 1/08; B32B 7/02; B29C 63/36
(Continued)

(56) References Cited

U.S. PATENT DOCUMENTS 3,927,164 A * 12/1975 Shimabukuro ...... B29D 23/001
156/247
4,009,063 A *  2/1977 Wood ..................... B29C 53/36
138/141
(Continued)

FOREIGN PATENT DOCUMENTS

CN         1765613 A      5/2006
JP        61 143129       6/1986
(Continued)

OTHER PUBLICATIONS

Decision of Rejection dated May 7, 2014 in Korean Patent Application No. 10-2013-0151427 (with English language translation).
(Continued)

*Primary Examiner* — Nicholas J Weiss
*Assistant Examiner* — Michael J Melaragno
(74) *Attorney, Agent, or Firm* — Oblon, McClelland, Maier & Neustadt, L.L.P.

(57) ABSTRACT

A lining material and method that prevent peeling at overlapping both circumferential ends (overlapping portion) of a lining material installed in a conduit. A lining material is inverted to be inside out to line a conduit. The lining material includes: an impermeable layer; a lining material main body provided inside the impermeable layer, the lining material main body made into a tubular form by rolling a base material sheet, with its both circumferential ends overlapping each other; and a tubular member provided inside the lining material main body.

10 Claims, 11 Drawing Sheets

(51) Int. Cl.
  *F16L 55/165* (2006.01)
  *B29C 63/36* (2006.01)
  *B32B 7/02* (2006.01)
  *B32B 5/02* (2006.01)
  *B32B 3/04* (2006.01)
  *B32B 7/12* (2006.01)
  *B32B 5/06* (2006.01)

(52) U.S. Cl.
  CPC ....... *F16L 55/1651* (2013.01); *F16L 55/1656* (2013.01); *B32B 3/04* (2013.01); *B32B 5/022* (2013.01); *B32B 5/024* (2013.01); *B32B 5/06* (2013.01); *B32B 7/12* (2013.01); *B32B 2250/44* (2013.01); *B32B 2255/02* (2013.01); *B32B 2255/26* (2013.01); *B32B 2260/021* (2013.01); *B32B 2260/046* (2013.01); *B32B 2262/0276* (2013.01); *B32B 2262/101* (2013.01); *B32B 2307/51* (2013.01); *B32B 2307/7242* (2013.01); *B32B 2307/7265* (2013.01); *B32B 2410/00* (2013.01); *B32B 2597/00* (2013.01)

(58) Field of Classification Search
  USPC .......................................................... 138/98
  See application file for complete search history.

(56) References Cited

U.S. PATENT DOCUMENTS

| | | | | |
|---|---|---|---|---|
| 4,064,211 A * | 12/1977 | Wood | B29C 63/0069 | 138/140 |
| 4,334,943 A * | 6/1982 | Zenbayashi | B29C 63/36 | 138/97 |
| 4,368,091 A * | 1/1983 | Ontsuga | B29C 63/36 | 118/215 |
| 4,427,480 A * | 1/1984 | Kamuro | B29C 63/36 | 138/140 |
| 4,439,469 A * | 3/1984 | Wood | B05D 7/222 | 427/230 |
| 4,576,205 A * | 3/1986 | Morinaga | F16L 55/1656 | 138/124 |
| 4,681,783 A * | 7/1987 | Hyodo | F16L 55/1656 | 138/124 |
| 4,686,126 A * | 8/1987 | Hyodo | F16L 11/02 | 138/97 |
| 4,723,579 A * | 2/1988 | Hyodo | B29C 63/343 | 138/119 |
| 4,768,562 A * | 9/1988 | Strand | F16L 55/1656 | 138/98 |
| 4,883,557 A * | 11/1989 | Morinaga | F16L 55/1651 | 138/98 |
| 4,972,880 A * | 11/1990 | Strand | F16L 55/163 | 138/103 |
| 4,976,290 A * | 12/1990 | Gelin | F16L 55/1656 | 138/141 |
| 5,164,237 A * | 11/1992 | Kaneda | B32B 1/08 | 138/125 |
| 5,186,215 A * | 2/1993 | Gilleland | F16L 55/163 | 138/110 |
| 5,186,987 A * | 2/1993 | Imoto | B32B 5/26 | 138/128 |
| 5,223,204 A * | 6/1993 | Endoh | B29C 63/36 | 138/97 |
| 5,334,429 A * | 8/1994 | Imoto | B29C 63/34 | 138/128 |
| 5,411,060 A * | 5/1995 | Chandler | B29C 63/34 | 138/103 |
| 5,439,033 A * | 8/1995 | Kamiyama | B29C 63/346 | 138/97 |
| 5,454,401 A * | 10/1995 | Kamiyama | B29C 63/346 | 138/97 |
| 5,566,719 A * | 10/1996 | Kamiyama | B29C 63/346 | 138/97 |
| 5,598,873 A * | 2/1997 | Kamiyama | B29C 63/346 | 138/97 |
| 5,653,555 A * | 8/1997 | Catallo | B29C 63/34 | 156/287 |
| 5,993,581 A * | 11/1999 | Toyoda | B29C 63/36 | 138/97 |
| 6,050,300 A * | 4/2000 | Schwert | B29C 63/36 | 138/97 |
| 6,152,184 A * | 11/2000 | Kamiyama | B29C 63/36 | 138/97 |
| 6,227,764 B1 * | 5/2001 | Einhaus | F16L 55/179 | 138/98 |
| 6,837,273 B2 * | 1/2005 | Woolstencroft | B29D 23/001 | 138/125 |
| 6,899,832 B2 * | 5/2005 | Wood | F16L 55/1651 | 156/287 |
| 7,096,890 B2 * | 8/2006 | Woolstencroft | F16L 55/1656 | 138/125 |
| 7,311,121 B2 | 12/2007 | Kamiyama et al. | | |
| 7,476,348 B2 * | 1/2009 | Waring | F16L 55/1651 | 138/97 |
| 7,478,650 B2 * | 1/2009 | Pleydon | B29D 23/001 | 138/125 |
| 7,845,372 B2 * | 12/2010 | Kiest, Jr. | F16L 55/1651 | 138/97 |
| 8,580,364 B2 * | 11/2013 | Quitter | B32B 1/08 | 138/98 |
| 8,757,215 B2 * | 6/2014 | Burdy | D03D 1/0041 | 139/383 R |
| 2006/0159791 A1 * | 7/2006 | Kamiyama | F16L 55/1651 | 425/11 |
| 2007/0001330 A1 * | 1/2007 | Driver | B29C 63/36 | 264/36.17 |
| 2008/0277012 A1 * | 11/2008 | Anders | F16L 55/1651 | 138/98 |
| 2009/0218002 A1 * | 9/2009 | Kashihara | D03D 1/0041 | 139/433 |
| 2010/0012214 A1 * | 1/2010 | Kamiyama | F16L 55/1656 | 138/98 |
| 2015/0068632 A1 * | 3/2015 | Onishi | B29C 63/34 | 138/97 |
| 2015/0328857 A1 * | 11/2015 | Ueda | F16L 55/1651 | 138/98 |

FOREIGN PATENT DOCUMENTS

| | | |
|---|---|---|
| JP | 2001-116165 A | 4/2001 |
| JP | 2011-25456 A | 2/2011 |
| JP | 2012 006334 | 1/2012 |
| JP | 2012 086386 | 5/2012 |
| JP | 2012 121264 | 6/2012 |
| JP | 2012 126129 | 7/2012 |
| KR | 10 2006 0012367 | 2/2006 |
| KR | 10-0956077 B1 | 5/2010 |

OTHER PUBLICATIONS

Extended European Search Report dated Aug. 19, 2016 in Patent Application No. 13860295.8.
Combined Office Action and Search Report dated May 12, 2016 in the corresponding Chinese Patent Application No. 201380063633.0 (with English translation and English translation of Category of Cited Documents).
Office Action dated Jun. 28, 2016 in the corresponding Japanese Patent Application No. 2012-268647 (with English translation).
Singaporean Office Action dated Nov. 9, 2016 in Singapore Patent Application No. 11201504412Q.
Office Action dated Jan. 13, 2016 in Singaporean Patent application No. 11201504412Q.
International Search Report dated Mar. 18, 2014 in PCT/JP13/082659 filed Dec. 5, 2013.
Korean office action dated Jan. 23, 2014, in Korean Patent Application No. 10-2013-0151427. (with English translation).

(56) References Cited

OTHER PUBLICATIONS

International Preliminary Report on Patentability and Written Opinion dated Jun. 9, 2015 in PCT/JP2013/082659 filed Dec. 5, 2013 (with English language translation).
Office Action dated Jun. 1, 2017 in Singaporean Patent Application No. 11201504412Q.
Office Action dated May 11, 2017 in Australian Patent Application No. 2013355697.
Office Action dated Sep. 22, 2017 in Australian Patent Application No. 2013355697.
Russian Office Action issued in RU2015127036, dated Oct. 3, 2017, 7pgs.

* cited by examiner

BEFORE INVERSION

START OF INVERSION

LINING MATERIAL FOR CONDUIT AND LINING METHOD FOR CONDUIT

TECHNICAL FIELD

The present invention relates to: a lining material for a conduit; and a method for lining a conduit.

BACKGROUND ART

To repair an existing aging conduit such as a water supply or sewer pipe, a pipe for agricultural water, or a gas pipe, there have been conventionally known methods as follows: a tubular lining material containing a liquid curable resin with reinforced fibers is installed on an inner surface of the existing conduit, and then the liquid curable resin is cured, thereby to construct, in the conduit, a robust lining structure including a fiber reinforced resin.

In a method described in Patent Literature 1, a base material sheet is used for a lining material. The base material sheet is formed of non-woven fabrics of organic fibers and woven fabrics made of glass yarns, in which non-woven and woven fabrics are laid on one another and jointed by needlepunching, and the base material sheet is impregnated with a liquid thermosetting resin. The base material sheet is rolled into a tubular form, and overlapping both ends of the base material sheet in its circumferential direction, that is, the overlapping both circumferential ends (an overlapping portion) are jointed to each other by a hot melt adhesive, to form the lining material. An outer surface of the lining material is composed of an impermeable tubular woven fabric. In the method described in Patent Literature 1, first, the tubular lining material is installed in a conduit, while being inverted so as to be inside out by applying compressed air (installation step). Then, a heating medium such as heated air or steam is supplied to the inside of the lining material, and thereby the lining material is pressurized from the inside thereof while being heated, to expand the diameter of the lining material (diameter expansion step). That cures the liquid thermosetting resin included in the lining material which is in close contact with the conduit, to form the robust lining structure on the inner surface of the conduit.

CITATION LIST

Patent Literature

Patent Literature 1: Japanese Unexamined Patent Publication No. 086386/2012 (Tokukai 2012-086386)

SUMMARY OF INVENTION

Technical Problem

FIG. 16A illustrates a conduit P and a lining material 101 installed therein. The lining material 101 has been inverted, and thus a tubular woven fabric 102 which covered an outer surface of the lining material 101 is positioned inside. When the lining material 101 proceeds in the conduit P while being inverted, an overlapping portion 101a of the lining material 101 may contact an inner surface of the conduit P. In a straight pipe portion of the conduit P, such contact with the inner surface of the conduit P is less likely to cause peeling at the overlapping portion 101a where ends are jointed by a hot melt adhesive. However, when the lining material 101 proceeds in a bending portion (bend) of the conduit P, the lining material 101 tries to rotate in its circumferential direction, as shown in FIG. 16B, because of the reason which will be described later. Especially, in a bending portion with a large curvature, the lining material 101 strongly tries to rotate in the circumferential direction. If the lining material 101 rotates in the conduit P, the overlapping portion 101a of the lining material 101 comes into contact with the inner surface of the conduit P, which causes peeling at the overlapping portion 101a. In other words, the overlapping portion 101a of the lining material 101 is pressed onto the inner surface of the conduit P, and thereby peeling occurs. If diameter expansion and curing are performed on the lining material 101 in which such peeling occurs, caused is unevenness in the diameter of the lining material 101. Therefore, the lining material 101 fails to have a desired thickness, leading to a problem of insufficient strength.

FIG. 17A illustrates an inversion leading end portion of the lining material 101 which is being inverted, viewed from the front with respect to a proceeding direction in which the lining material 101 proceeds. FIG. 17B is a longitudinal sectional view of a bending portion of the conduit in which the lining material is being installed. The following deals with a case where the lining material 101 is inverted with its inversion leading end line 103 extending in a right-left direction (horizontal direction) in a straight pipe portion of the conduit P, as shown in FIG. 17A. The inversion leading end line 103 is a line formed at a portion where the lining material 101 starts to be inside out. In a bending portion which is included in the conduit P shown in FIG. 17A and bending to change the orientation of the conduit P from the horizontal direction to a vertical direction, the inversion easily proceeds because the inversion leading end line 103 remains extending in the horizontal direction, and therefore a force urging the lining material 101 to rotate is less likely to be exerted onto the lining material 101. FIG. 17B illustrates the lining material 101 inverted in such a bending portion. As illustrated, the inversion starts from the lower half portion, which is a portion lower than the inversion leading end line 103, and therefore, the lining material 101 proceeds without rotation. However, in a bending portion which is included in the conduit P and bends toward the right or left, that is, which bends within a horizontal plane, the lining material 101 tries rotating from the state where the inversion leading end line 103 extends in the right-left direction (horizontal direction) as shown in FIG. 17A to the state where the inversion leading end line 103 extends in an up-down direction (vertical direction) to make the inversion easier. Because this behavior functions as a force to rotate the overall lining material 101, the lining material tries rotating in the circumferential direction of the conduit P in the bending portion, with the result that peeling occurs at the overlapping portion 101a.

An object of the present invention is to prevent peeling at overlapping both circumferential ends (overlapping portion) of a lining material installed in a conduit.

Solution to Problem

According to a first aspect of the invention, a lining material for a conduit, the lining material being inverted to be inside out to line the conduit, includes: an impermeable layer; a lining material main body provided inside the impermeable layer, the lining material main body made into a tubular form by rolling a base material sheet, with its both circumferential ends overlapping each other; and a tubular member provided inside the lining material main body.

In this aspect, the tubular member is provided inside the lining material main body, before inversion. Therefore, when the lining material is installed in the conduit while being inverted to be inside out, that is, while the lining material main body and the tubular member are inverted, the tubular member to be positioned outside prevents the overlapping both circumferential ends of the lining material main body from contacting an inner surface of the conduit. This prevents peeling at the overlapping both circumferential ends of the lining material main body, especially in a bending portion of the conduit where the lining material tries to rotate in the circumferential direction.

According to a second aspect of the invention, the lining material of the first aspect is arranged such that a diameter of the tubular member is larger than a diameter of the lining material main body.

In this aspect, the diameter of the tubular member is larger than the diameter of the lining material main body, and therefore, it is possible to invert the lining material to be inside out, that is, to invert the lining material main body and the tubular member, and the tubular member does not interfere with diameter expansion at the both circumferential ends of the inverted lining material main body.

According to a third aspect of the invention, the lining material of the second aspect is arranged such that: the tubular member has a slack portion; and the slack portion does not contact an overlapping portion where both circumferential ends of the lining material main body overlap each other.

In this aspect, the slack portion of the tubular member does not contact the overlapping portion where the both circumferential ends of the lining material main body overlap each other. Therefore, as shown in FIG. 1, the slack portion (A) is not caught into the overlapping portion (2*a*) when the slack portion (A) of the tubular member (8) is extended in the process of inversion or diameter expansion, and the tubular member (8) prevents peeling of the overlapping portion (2*a*) (the overlapping both circumferential ends) of the lining material main body (2).

According to a fourth aspect of the invention, the lining material of any one of the first to third aspects is arranged such that the lining material main body and the tubular member are releasably jointed to each other.

In this aspect, the lining material main body and the tubular member are releasably jointed together into one member, and therefore, no shift occurs between the lining material main body and the tubular member when inverted. In other words, the lining material main body is not moved by a force applied to the tubular member, and this ensures prevention of peeling at the overlapping both circumferential ends of the lining material main body due to the tubular member when the tubular member is inverted.

According to a fifth aspect of the invention, the lining material of the fourth aspect is arranged such that inside the lining material main body, the tubular member is releasably jointed to an inner surface of an overlapping portion where both circumferential ends of the lining material main body overlap each other.

In this aspect, inside the lining material main body, the tubular member is releasably jointed to the inner surface of the overlapping portion where the both circumferential ends of the lining material main body overlap each other. Therefore, in the process of lining, it is possible to prevent peeling by the tubular member at the overlapping portion of the lining material main body, where the both circumferential ends thereof overlap each other, even in the case where the conduit has a complicated structure with a larger number of bending portions.

According to a sixth aspect of the invention, the lining material of any one of the first to fifth aspects is arranged such that the tubular member is a tubular woven fabric.

In this aspect, the tubular member is a tubular woven fabric, which has high permeability of the liquid thermosetting resin to be impregnated into the lining material main body, and which reduces the possibility that the tubular member is deformed. Therefore, the lining process is performed stably.

According to a seventh aspect of the invention, the lining material of the sixth aspect is arranged such that the tubular woven fabric has no seam in an axial direction of the tubular woven fabric.

In this aspect, since the tubular member has no seam in its axial direction, that is, which has no joint in the axial direction, its elongation in the circumferential direction is uniform. This facilitates smooth inside-out inversion of the lining material.

According to an eighth aspect of the invention, the lining material of any one of the first to seventh aspects is arranged such that the impermeable layer includes a tubular woven fabric which is woven from synthetic yarns, an outer surface of the tubular woven fabric being coated with a coating of a thermoplastic resin.

In this aspect, the impermeable layer is formed of: the tubular woven fabric; and the thermoplastic resin coating on the outer surface of the tubular woven fabric. That is, the tubular woven fabric is reinforced by the coating. This enables inversion of the lining material to be performed stably.

According to a ninth aspect of the invention, a method for lining a conduit having a bending portion including: impregnating the lining material described in any one of the first to eighth aspects with a curable resin; and subsequently inverting the lining material to line the conduit.

In this aspect, the lining material main body and the tubular member provided inside the lining material main body are inverted together to line the conduit. Therefore, the tubular member to be positioned outside prevents the overlapping portion of the lining material main body from contacting the inner surface of the conduit, when inverted. This prevents peeling at the overlapping portion of the lining material main body, especially in the bending portion of the conduit.

Advantageous Effects of Invention

In the present invention, the tubular member is provided inside the lining material main body, before inversion. Therefore, when the lining material is installed in the conduit while being inverted to be inside out, that is, while the lining material main body and the tubular member are inverted, the tubular member to be positioned outside prevents the overlapping both circumferential ends of the lining material main body from contacting the inner surface of the conduit. This prevents peeling at the overlapping both circumferential ends of the lining material main body, especially in a bending portion of the conduit where the lining material tries to rotate in the circumferential direction.

BRIEF DESCRIPTION OF DRAWINGS

FIG. 8 is an enlarged view illustrating an inversion apparatus and the like.

DESCRIPTION OF EMBODIMENTS

Figure 1:
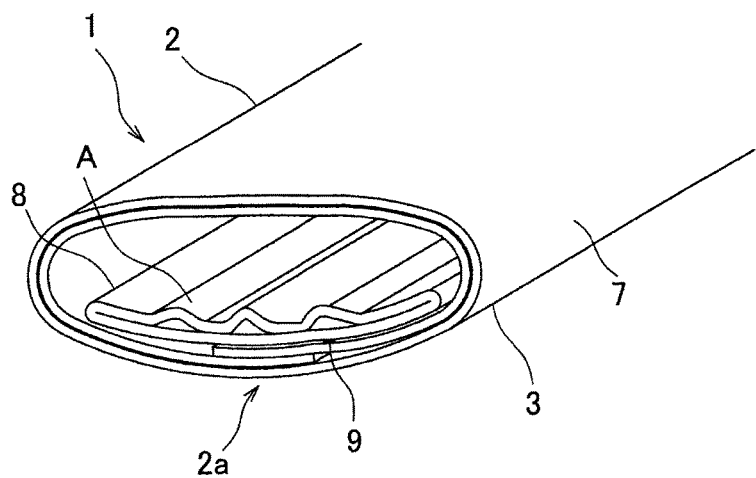
FIG. 1 is a perspective view of a lining material of an embodiment.

The following describes an embodiment of the present invention. FIG. 1 is a perspective view of a lining material 1 of this embodiment. The lining material 1 of this embodiment is used, for example, to repair an existing conduit for agricultural water. The lining material 1 is inverted to be inside out, to line such a conduit. In this embodiment, an object to be repaired is an agricultural water pipe with a pipe diameter of approximately 700 mm.

Figure 2:
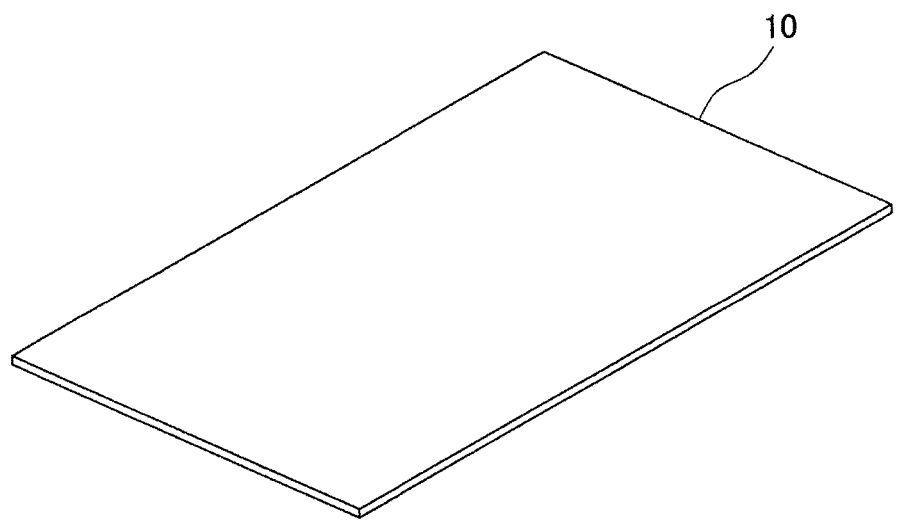
FIG. 2 is a perspective view of a base material sheet.
Figure 3:
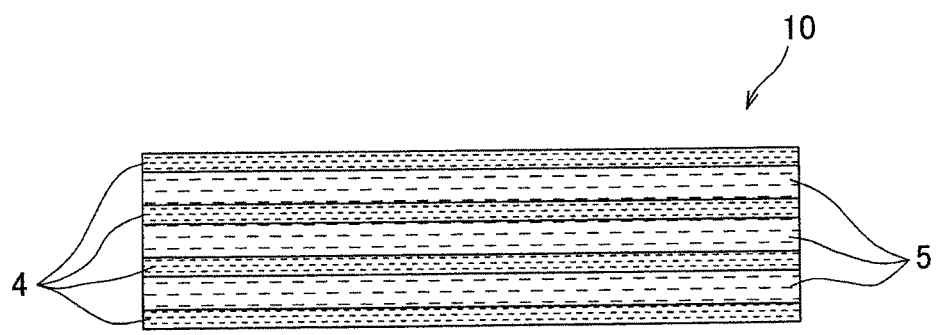
FIG. 3 is a sectional view of the base material sheet.

First, the structure of the lining material 1 will be described. The lining material 1 includes a lining material main body 2. FIG. 2 is a perspective view of a base material sheet 10, forming the lining material main body 2. FIG. 3 is a sectional view of the base material sheet 10. As shown in FIG. 2, the base material sheet 10 is a sheet-like member. The base material sheet 10 is rolled into a tubular form, and both circumferential ends of the base material sheet 10 are laid on to overlap each other in its circumferential direction, thereby to form the lining material main body 2. Further, as shown in FIG. 1, the lining material main body 2 in the rolled tubular form is inserted into an impermeable tubular woven fabric 3 (impermeable layer) covered with a coating 7.

As shown in FIG. 3, the base material sheet 10 is formed of a plurality of layers which are: non-woven fabrics 4 of organic fibers such as polyester (e.g., spunbond non-woven fabrics); and woven glass roving fabrics 5 (reinforced fiber layers) each made by weaving high-strength glass roving. The non-woven fabrics 4 and the woven glass roving fabrics 5 are alternately laid on one another, and jointed together by needlepunching. Specifically, the non-woven fabrics 4 are respectively laid on both sides of each woven glass roving fabric 5, and thus each woven glass roving fabric 5 is sandwiched by the non-woven fabrics 4.

Figure 4:
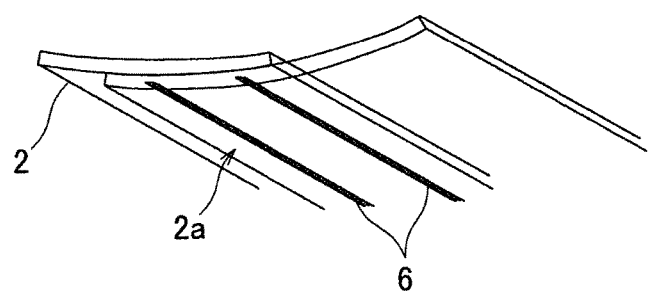
FIG. 4 is an enlarged view of an overlapping portion of a lining material main body in FIG. 1, where both circumferential ends overlap each other.

The both circumferential ends of the base material sheet 10 rolled into the tubular form are jointed to each other by a hot melt adhesive 6 with the both ends overlapping each other, to form the lining material main body 2. FIG. 4 is an enlarged view of an overlapping portion of the lining material main body 2 in FIG. 1, where the both circumferential ends overlap each other. As shown in FIG. 4, the hot melt adhesive 6 is not applied to all over a surface of one of the ends of the lining material main body 2, but is partially applied thereto, specifically to a plurality of (two in FIG. 4) elongate regions on the surface which regions are parallel to a longitudinal direction of the tubular form. Then, the other end of the lining material main body 2 is laid on the surface of the one end on which the hot melt adhesive 6 has been applied, to joint the both ends of the lining material main body 2 to each other. Note that, hereinafter, the portion where the both circumferential ends of the lining material main body 2 overlap each other will be referred to as an "overlapping portion 2a".

Note that, as for the firmness of the joint, it is only required that the both circumferential ends of the lining material main body 2 are releasably jointed to prevent shifting relative to each other when the lining material main body 2 is inserted into a conduit P while being inverted. As will be described later, when the lining material main body 2 is heated in a diameter expansion step which is conducted after the lining material main body 2 (the lining material 1) is installed in the conduit P, the hot melt adhesive 6 is softened and thereby the jointed both ends are released.

The tubular woven fabric 3 shown in FIG. 1 is obtained, for example, by weaving polyester yarns. The outer surface of the tubular woven fabric 3 is coated with the coating 7 of a thermoplastic resin such as polyethylene, polypropylene, nylon, and polyester, to make the tubular woven fabric 3 impermeable. Into the tubular woven fabric 3, the lining material main body 2 in the rolled tubular form is drawn and inserted, and thereby the outer surface of the lining material main body 2 is covered with the tubular woven fabric 3.

The lining material main body 2 is produced through the following processes, for example. First, glass roving is woven on a plain weaving machine, into the woven glass roving fabrics 5. Then, the woven glass roving fabrics 5 and the non-woven fabrics 4 are alternately laid on one another and jointed together by needlepunching, and this lamination is cut to form the base material sheet 10 having a predetermined width.

The lining material 1 of this embodiment further includes a tubular member 8 which is provided inside the lining material main body 2 before inverted. The tubular member 8 is a tubular woven fabric which has no seam in its axial direction (its longitudinal direction). To form the tubular member 8, a yarn is circularly woven on a circular weaving machine, and this makes the tubular member 8 seamless in its circumferential direction. Then, as shown in FIG. 1, the tubular member 8 is disposed on an inner surface of the overlapping portion 2a of the lining material main body 2 (on an inner surface of a lower portion of the lining material main body 2), and is releasably jointed to the inner surface by a hot melt adhesive 9. The hot melt adhesive 9 is partially applied between the lining material main body 2 and the tubular member 8, that is, to elongate regions parallel to the longitudinal direction. The hot melt adhesive 9 prevents the tubular member 8 from moving on the base material sheet 10. The tubular member 8 is disposed inside the lining material main body 2 to extend in the longitudinal direction of the lining material main body 2, and therefore the circumferential direction of the lining material main body 2 is identical to the circumferential direction of the tubular member 8. Further, the diameter of the tubular member 8 is set to be larger than the diameter of the lining material main body 2.

The specification of the tubular member 8 for a conduit having an inner diameter of 700 mm, for example, is as follows.

(Structure) Warp: polyester yarn, 1100T/3×1500
Weft: polyester yarn, 1100T/3
(Initial Diameter) 700 mm
(Thickness of Woven Fabric) 0.9 mm After the tubular member 8 is disposed on the lining material main body 2, the base material sheet 10 is rolled into the tubular form. Then, the hot melt adhesive 6 is applied to a surface of one circumferential end of the base material sheet 10, and the other circumferential end of the sheet 10 is laid on the one end to joint the both ends to each other, thereby to form the lining material main body 2. In this process, the tubular member 8 is disposed so that, as shown in FIG. 1, a slack portion A of the tubular member 8 does not contact the overlapping portion 2a where the both circumferential ends overlap each other. To be more specific, the tubular member 8 is squashed to be substantially flat in the lining material main body 2, and thereby to have two sides of: an outer side (outer surface) which contacts the overlapping portion 2a of the lining material main body 2; and an inner side (inner surface) which does not contact the overlapping portion 2a of the lining material main body 2. Here, the slack portion A is disposed on the inner side, so that the slack portion A does not contact the overlapping portion 2a. Thus, in the lining material 1 before inverted, the tubular woven fabric 3, the lining material main body 2, and the tubular member 8 are positioned in this order from the outside to the inside. To dispose the tubular member 8 in the lining material main body 2, the tubular member 8 may be drawn into the lining material main body 2.

The thus produced tubular lining material 1 is impregnated with a liquid thermosetting resin. In this process, the liquid resin is injected into the inside of the innermost tubular member 8, to impregnate, with the liquid thermosetting resin, the whole of the tubular woven fabric 3, the lining material main body 2, and the tubular member 8, which are positioned inside the coating 7. To impregnate these with the liquid resin, there may be adopted a general way in which the lining material 1 into which the liquid thermosetting resin has been injected is squeezed using a nip roller. However, for more uniform impregnation, it is preferable to perform the following process before squeezing on the nip roller: injecting a liquid resin having a lower viscosity than that of generally used resins (i.e., a liquid resin dripping at normal temperature); and then conveying the lining material main body 2, into which the liquid resin has been injected, to a higher position. With this, the lining material main body 2 is uniformly impregnated with the liquid resin while extra liquid resin attached to the lining material main body 2 is gravitationally removed. Further, as compared with the way in which the lining material main body 2 is squeezed using the nip roller only, the period of time required for the resin impregnation process is shortened. Further, it is effective to depressurize the inside of the lining material 1 in addition to the above.

Note that, if the lining material 1 is conveyed after impregnated with the resin, the low-viscous liquid resin may drip. Therefore, it is preferable to conduct a viscosity increasing process (e.g., heating, cooling, or the like) depending on the type of the liquid resin to increase the viscosity, before the lining material 1 is conveyed.

The following describes a process of repairing the existing conduit P using the above-described lining material 1. To repair the conduit P using the lining material 1, first, the lining material 1 is installed in the conduit P to be repaired while being inverted to be inside out (installation step). Then, the diameter of the lining material main body 2 of the lining material 1 installed in the conduit P is expanded by circumferentially sliding the both circumferential ends of the lining material main body 2, on each other (diameter expansion step). In the above diameter expansion step, the lining material main body 2 is heated and pressurized from the inside thereof, to cure the liquid resin impregnated into the lining material main body 2 and to expand the diameter of the lining material main body 2.

(Installation Step)

Figure 5:
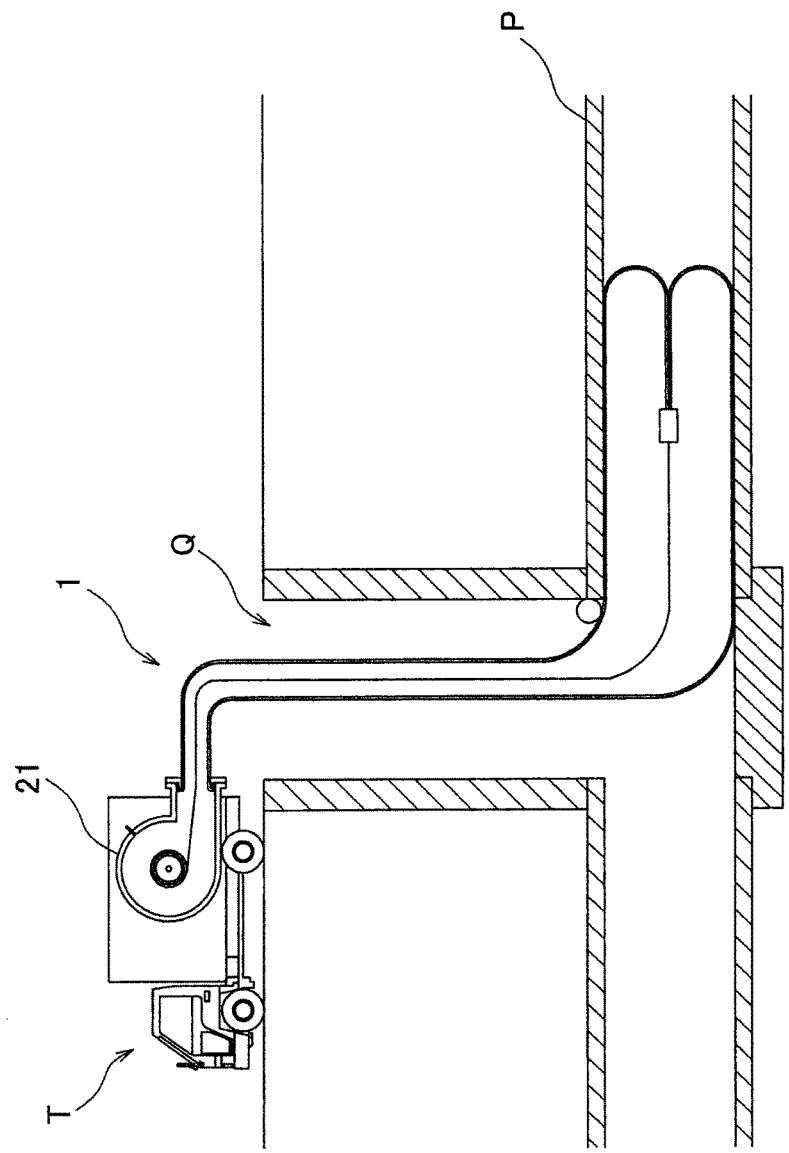
FIG. 5 is a longitudinal sectional view of a conduit and the like in a process of installing the lining material.
Figure 6:
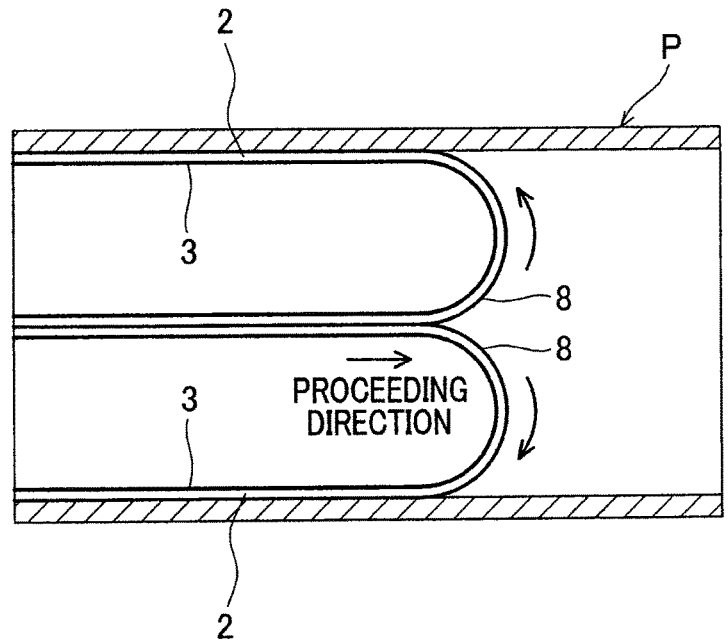
FIG. 6 is an enlarged view of a leading end portion of the lining material of FIG. 5.
Figure 7:
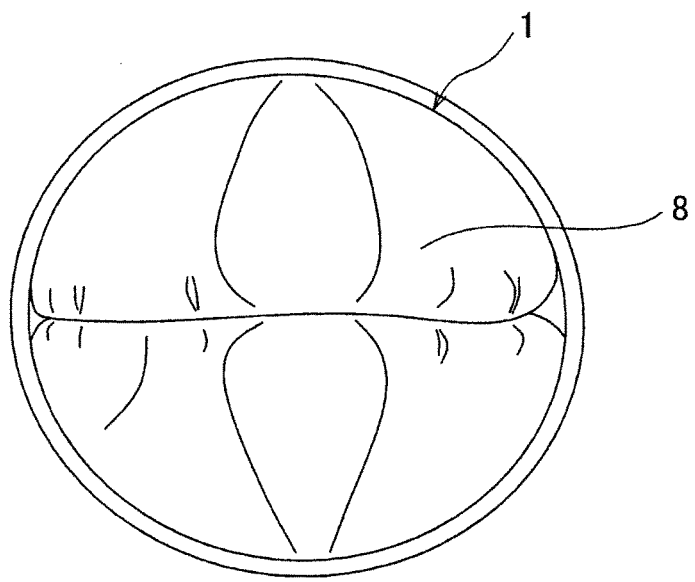
FIG. 7 illustrates the leading end portion of the inverted lining material which is being installed, viewed from a front with respect to a proceeding direction of the lining material.

First, the installation step will be described. FIG. 5 is a longitudinal sectional view of the conduit P and the like in the process of installing the lining material 1. FIG. 6 is an enlarged view of a leading end portion of the lining material 1 of FIG. 5. FIG. 7 illustrates the leading end portion of the inverted lining material 1 which is being installed, viewed from the front with respect to the proceeding direction of the lining material 1. As shown in FIG. 5 to FIG. 7, in this embodiment, compressed air is applied to the tubular lining material 1 impregnated with the liquid thermosetting resin, thereby to install the lining material 1 in the conduit P while inverting the lining material 1 to be inside out (inversion method).

Figure 8:
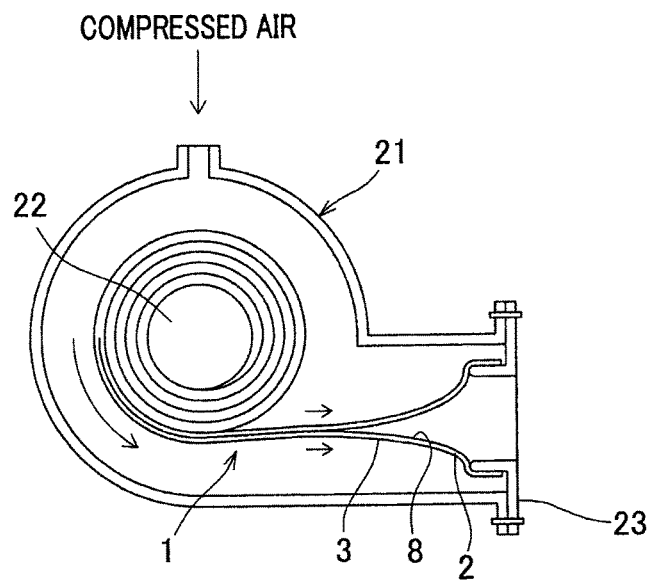

As shown in FIG. 5, the conduit P communicates with a pit Q opened onto the ground, and the lining material 1 is installed in the conduit P through the pit Q. FIG. 8 is an enlarged view of an inversion apparatus 21. Note that FIG. 8 illustrates the state where the lining material 1 has not been inverted yet. As shown in the figure, the lining material 1 is wound around a reel 22 of the inversion apparatus 21 provided in a truck T on the ground. Further, the leading end of the lining material 1 is annularly fixed to a mouth ring 23 of the inversion apparatus 21. That is, the lining material main body 2, the tubular woven fabric 3, and the tubular member 8 are expanded radially, and are annularly fixed onto an outer peripheral surface of the mouth ring 23 by a metal band (not illustrated), for example.

Figure 9:
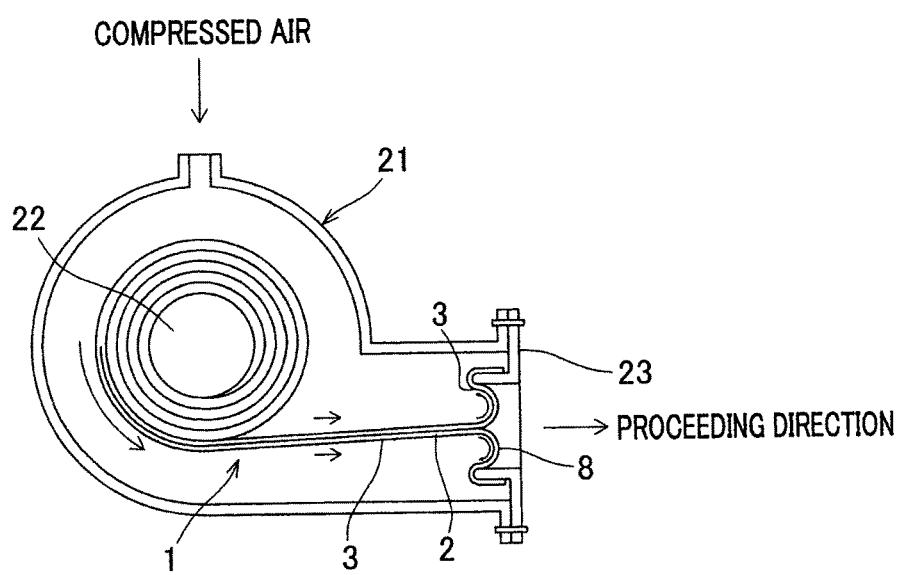
FIG. 9 illustrates the lining material at the start of the inversion.
Figure 10:
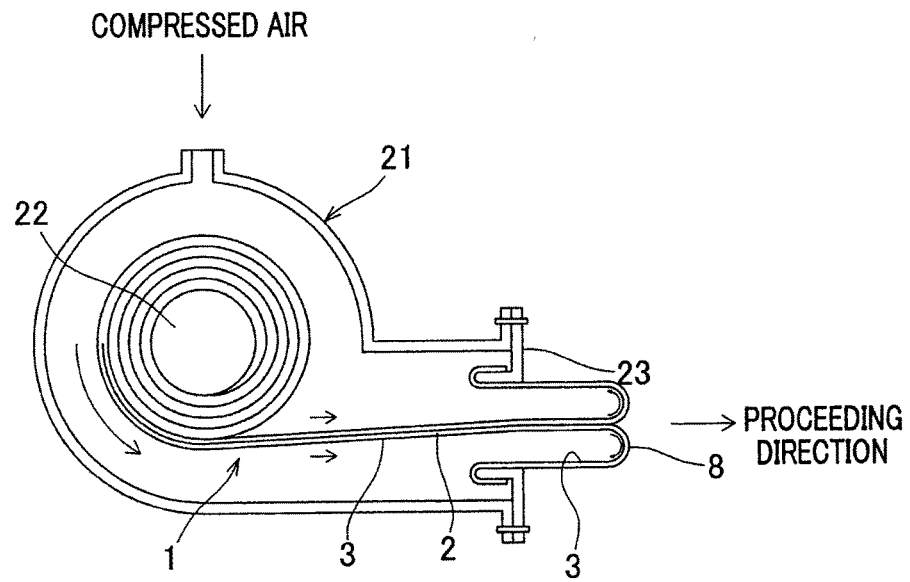
FIG. 10 illustrates the lining material in the middle of the inversion.
Figure 11:
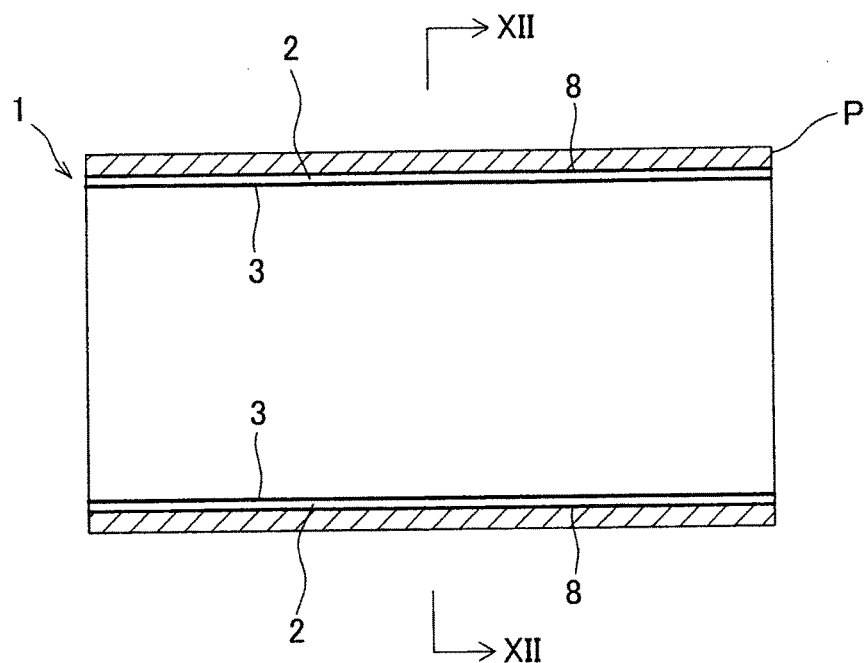
FIG. 11 is a longitudinal sectional view of the lining material installed in the conduit.

Under the condition shown in FIG. 8, compressed air is supplied to the inversion apparatus 21, and then pneumatic pressure is applied to a folded portion of the lining material 1 fixed to the mouth ring 23. Since the tubular woven fabric 3 covering the outer surface of the lining material main body 2 has impermeability, the applied pneumatic pressure advances the folded portion of the lining material 1 in the proceeding direction (to the right), and the lining material 1 starts to be inverted as shown in FIG. 9. At this time, the lining material 1 proceeds while being unwound from the reel 22. Then, the lining material 1 is kept inverted while being advanced in the proceeding direction, as shown in FIG. 10. Eventually, as shown in FIG. 11, the lining material 1 is inverted to be inside out over its whole length and installed in the conduit P. The tubular member 8, the lining material main body 2, and the tubular woven fabric 3 are positioned in this order from the outside to the inside.

In this inversion method, compressed air advances the leading end portion of the inverted lining material 1 along the conduit P, and this makes it relatively easier to install the lining material 1 in the conduit P having a bending portion. Further, as described above, in the installation step, the both circumferential ends of the lining material main body 2 are jointed (releasably jointed) to each other by the hot melt adhesive 6, and this prevents the both ends from shifting relative to each other and thereby expanding the lining material main body 2 during the inside-out inversion of the lining material 1.

(Diameter Expansion Step)

Figure 12:
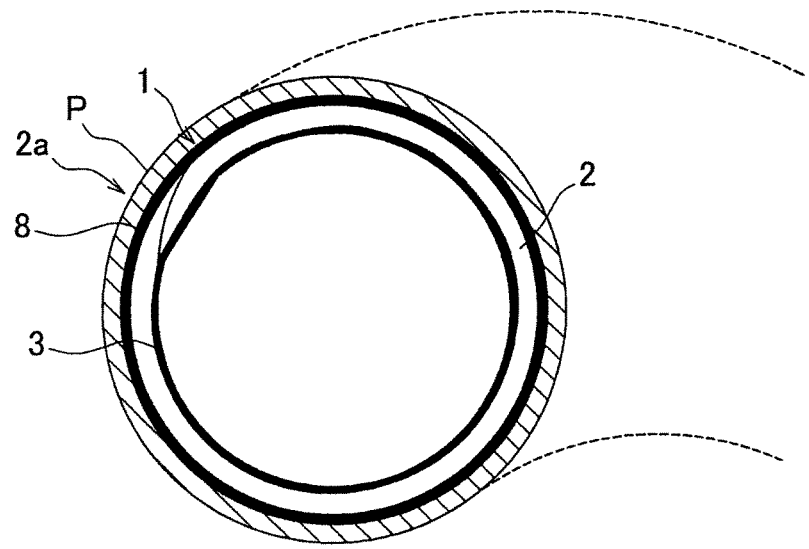
FIG. 12 is a sectional view taken along a line XII-XII in FIG. 11.
Figure 13:
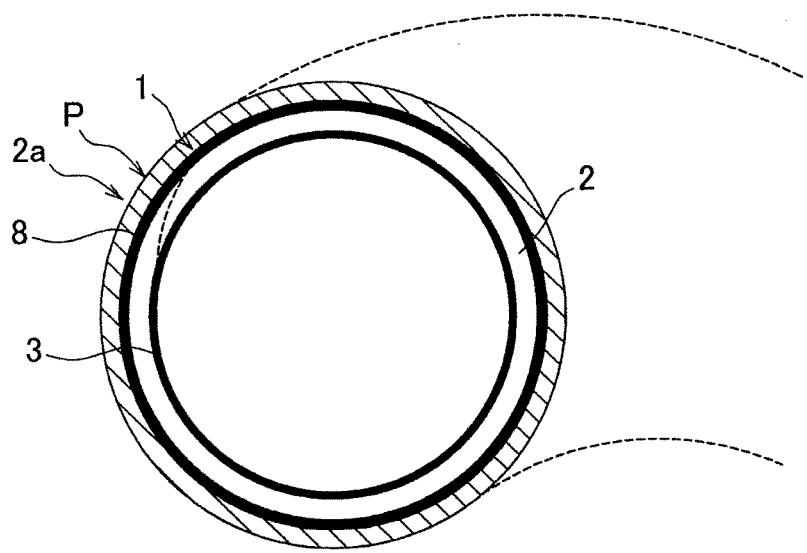
FIG. 13 is a sectional view of the lining material of which diameter has been expanded.

Next, description will be given for the diameter expansion step. FIG. 12 is a sectional view taken along a line XII-XII in FIG. 11. FIG. 13 is a sectional view of the lining material 1 of which diameter has been expanded. After the installation step (after inverted), the tubular woven fabric 3 is positioned inside the lining material main body 2, and the inner surface of the tubular woven fabric 3 is coated with the impermeable coating 7. Therefore, by supplying a heating medium such as heated air or steam into the tubular woven fabric 3, the lining material main body 2 is pressurized from the inside thereof, while being heated, for diameter expansion.

In this diameter expansion step, the lining material 1 is heated to the setting temperature of the thermosetting resin (for example, 80 to 100 degrees Celsius). In this process, the hot melt adhesive 6 releasably jointing the both circumferential ends of the lining material main body 2 is softened, and thereby its adhesion is decreased, which allows the both ends of the lining material main body 2 to circumferentially slide on each other. Note that the type of the hot melt adhesive 6 may be determined appropriately depending on the setting temperature of the liquid thermosetting resin. Simultaneously with this heating, the lining material main body 2 is pressurized from the inside thereof, and this causes the both circumferential ends of the lining material main body 2 to circumferentially slide on each other, to increase the diameter of the lining material main body 2. As a result, the lining material main body 2 is pressed to the inner surface of the conduit P to be brought into close contact with the inner surface, and in this state, the thermosetting resin is thermally set. Thus, on the inner surface of the conduit P, there is formed a robust lining structure in which the thermosetting resin is reinforced by the high-strength woven glass roving fabrics 5.

As described above, the lining material 1 of this embodiment includes the tubular member 8 which is provided inside the lining material main body 2 before inverted. The tubular member 8 to be positioned outside prevents the overlapping both circumferential ends (overlapping portion 2a) of the lining material main body 2 from contacting the inner surface of the conduit P when the lining material 1 is installed in the conduit P while being inverted to be inside out, that is, while the tubular woven fabric 3, the lining material main body 2, and the tubular member 8 are inverted, in the installation step. This prevents peeling at the overlapping both circumferential ends of the lining material main body 2, especially in the bending portion.

Further, the diameter of the tubular member 8 is larger than the diameter of the lining material main body 2, and therefore, it is possible to invert the lining material 1 to be inside out, that is, to invert the lining material main body 2 and the tubular member 8, and the tubular member 8 does not interfere with diameter expansion at the circumferential both ends (overlapping portion 2a) of the inverted lining material main body 2.

Moreover, the slack portion A of the tubular member 8 does not contact the overlapping portion 2a where the both circumferential ends of the lining material main body 2 overlap each other. Therefore, as shown in FIG. 1, the slack portion A is not caught into the overlapping portion 2a when the slack portion A of the tubular member 8 is extended in the process of inversion or diameter expansion, and the tubular member 8 prevents peeling of the overlapping portion 2a of the lining material main body 2.

In addition, the lining material main body 2 and the tubular member 8 are releasably jointed together into one member, and therefore, no shift occurs between the lining material main body 2 and the tubular member 8 when inverted. In other words, the lining material main body 2 is not moved by a force applied to the tubular member 8, and this ensures prevention of peeling at the overlapping both circumferential ends of the lining material main body 2 due to the tubular member 8 when the tubular member 8 is inverted.

Moreover, inside the lining material main body 2, the tubular member 8 is releasably jointed to the inner surface of the overlapping portion 2a where the both circumferential ends of the lining material main body 2 overlap each other. Therefore, in the process of lining, it is possible to prevent peeling by the tubular member 8 at the overlapping portion 2a of the lining material main body 2, where the both circumferential ends thereof overlap each other, even in the case where the conduit P has a complicated structure with a larger number of bending portions.

In addition, the tubular member 8 is the tubular woven fabric, which has high permeability of the liquid thermosetting resin to be impregnated into the lining material main body 2, and which reduces the possibility that the tubular member 8 is deformed. Therefore, the lining process is performed stably. Further, when an open weave fabric is used as the tubular member 8, the permeability of the liquid thermosetting resin into the tubular member 8 is further increased. Furthermore, since the tubular member 8 is the tubular woven fabric which has no seam in its axial direction, that is, which has no joint in the axial direction, its elongation in the circumferential direction is uniform. This facilitates smooth inversion of the lining material 1 to be inside out, that is, smooth inversion of the lining material main body 2 and the tubular member 8.

In addition, the base material sheet 10 includes the woven fabrics made of the glass yarns (the woven glass roving fabrics 5), and thus includes high-strength fibers. Therefore, the base material sheet 10 has a high strength, and this makes it possible to decrease the overall thickness of the lining material main body 2 (base material sheet 10). In addition, each woven fabric made of the glass yarns, which are the high-strength fibers, is particularly the woven glass roving fabric 5, and this further enhances the strength of the lining material main body 2. Now, because of high elasticity of the lining material main body 2, it is impossible to expand the periphery of the lining material main body 2 installed in the conduit P to bring it to be in close contact with the inner surface of the conduit P. In this embodiment, the diameter of the lining material main body 2 is expanded in the diameter expansion step by sliding the both circumferential ends of the lining material main body 2 (the ends at the overlapping portion 2a), and thereby the lining material main body 2 is brought into close contact with the inner surface of the conduit P.

The base material sheet 10 is formed of: woven fabrics each made of glass yarns which are high-strength fibers (the woven glass roving fabrics 5); and non-woven fabrics 4 of organic fibers, the woven fabrics and the non-woven fabrics being laid on one another and jointed together by needlepunching. Each non-woven fabric 4 has a structure in which long fibers are entangled. Therefore, if an external force is applied to any of the woven glass roving fabrics 5, the non-woven fabric 4 laid on and jointed to that woven glass roving fabric 5 by needlepunching applies resistance to its glass yarns. This suppresses yarn slippage of the woven glass roving fabric 5. The non-woven fabrics 4 also prevent raveling out of the woven glass roving fabrics 5 made of the glass yarns at its edge. Thus, a uniform and high-strength lining structure is constructed inside the conduit P.

Further, in the above diameter expansion step, the lining material main body 2 is heated and pressurized from the inside thereof, to set the liquid thermosetting resin with which the lining material main body 2 has been impregnated while expanding the diameter of the lining material main body 2. With this, a robust lining structure is constructed on the inner surface of the conduit P.

Further, the both circumferential ends of the lining material main body 2 in the rolled tubular form (the both ends at the overlapping portion 2*a*) are jointed to each other by the hot melt adhesive 6 with the both ends overlapping each other. This further prevents peeling at the overlapping ends. Further, this prevents the both ends from shifting relative to each other and thereby expanding the lining material main body 2 when the lining material 1 is inserted into the conduit P in the installation step. Furthermore, when the lining material main body 2 is heated and pressurized after installed in the conduit P, the hot melt adhesive 6 is softened, and thereby its adhesion is decreased. As a result, the both circumferential ends move and slide on each other to expand the diameter of the lining material main body 2, to bring it into close contact with the inner surface of the conduit P, and the thermosetting resin is set in this state.

Hereinbefore, the embodiment of the present invention has been described. Application of the present invention is not limited to the above embodiment, and various modifications and variations are possible within the scope of the spirit of the invention, as described below, for example.

Figure 14A:
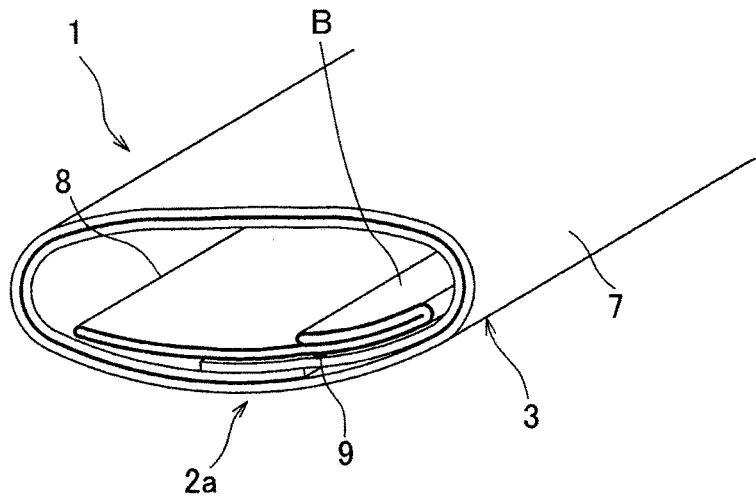
FIGS. 14A and 14B each is a perspective view of a lining material of a modification.
Figure 14B:
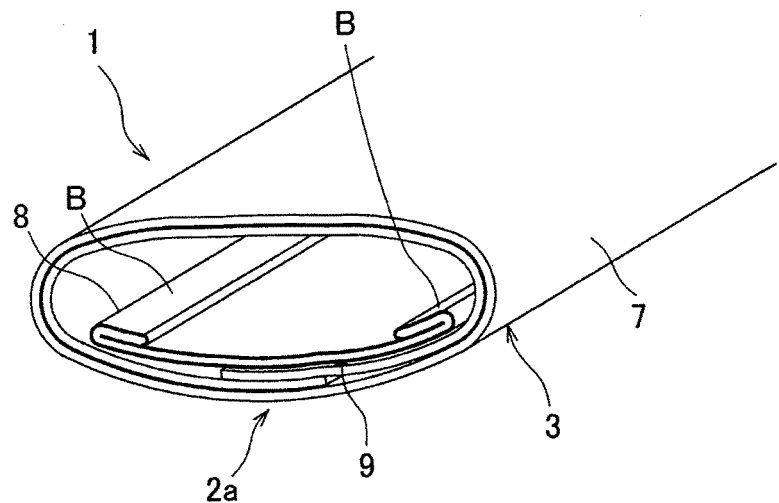

In the above-described embodiment, the diameter of the tubular member 8 is larger than the diameter of the lining material main body 2, and the slack portion A of the tubular member 8 is on its inner side (inner surface) which does not contact the overlapping portion 2*a* of the lining material main body 2. The present invention is not limited to this, and as shown in FIG. 14A, one end portion of the tubular member 8 may be folded back (folded portion B), inside the lining material main body 2, toward the inner side (toward the inner surface) which does not contact the overlapping portion 2*a* of the lining material main body 2. Alternatively, as shown in FIG. 14B, both end portions of the tubular member 8 may be folded back (folded portions B), inside the lining material main body 2, toward the inner side (toward the inner surface) which does not contact the overlapping portion 2*a* of the lining material main body 2.

Figure 15A:
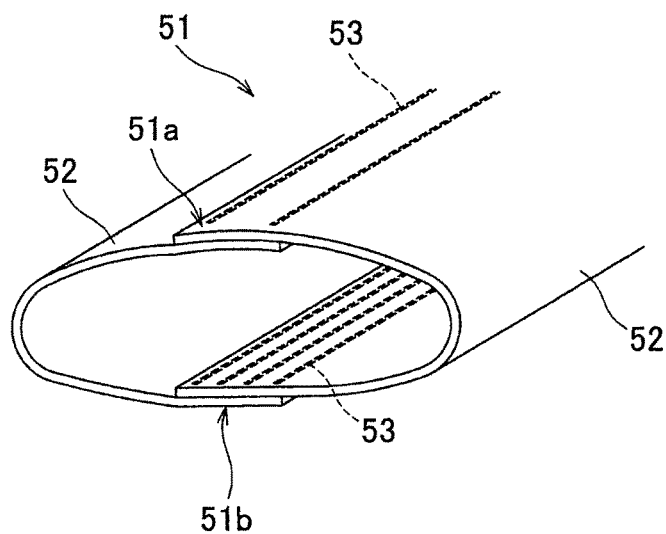
FIGS. 15A and 15B each is a perspective view of a lining material main body of a modification.

In the above-described embodiment, the both circumferential ends of the single base material sheet 10 rolled into the tubular form are jointed to each other by the hot melt adhesive 6 with the both ends overlapping each other, to form the lining material main body 2. The present invention is not limited to this, and two or more base material sheets may be used to form a larger-diameter lining material main body, for a conduit having a large diameter. FIG. 15A is a perspective view of a lining material main body 51 constituted by two base material sheets 52 of the same size. As shown in FIG. 15A, the both circumferential ends of one of the two base material sheets 52 are respectively jointed to the both circumferential ends of the other by a hot melt adhesive 53, with each pair of ends overlapping each other. As for the firmness of the joint at one overlapping portion 51*a*, where the overlapping ends are to be slid on each other for diameter expansion, it is only required that these ends are releasably jointed to each other to prevent shifting relative to each other. Therefore, the hot melt adhesive 53 is partially applied to two elongate regions which are parallel to the longitudinal direction of the tubular form. As for the firmness of the joint at the other overlapping portion 51*b*, the overlapping ends have to be jointed to each other so as to be fixed, and therefore the hot melt adhesive is applied to four elongate regions parallel to the longitudinal direction of the tubular form. Thus, in the lining material main body 51 constituted by the two base material sheets 52, the ends at the one overlapping portion 51*a* out of the two overlapping portions 51*a* and 51*b* are slid on each other, while the ends at the other overlapping portion 51*b* remain fixed. The two overlapping portions 51*a* and 51*b* are positioned at 180 degrees relative to each other. When three base material sheets of the same size are used, similarly to the above, the sheets are combined into a tubular form with each pair of circumferential ends overlapping each other, and each pair of overlapping circumferential ends are jointed to each other by a hot melt adhesive. In this case, the ends at one of overlapping portions are slid on each other, but the ends at the remaining two overlapping portions remain fixed. The three overlapping portions are positioned at intervals of approximately 120 degrees.

Figure 15B:
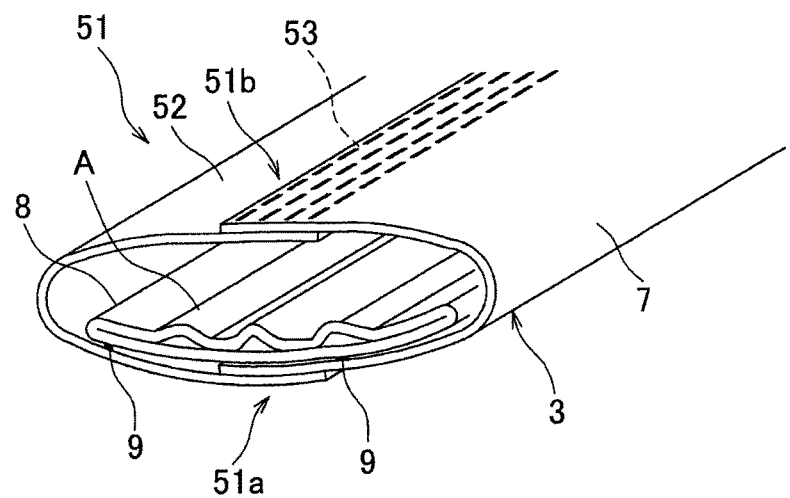
Figure 16A:
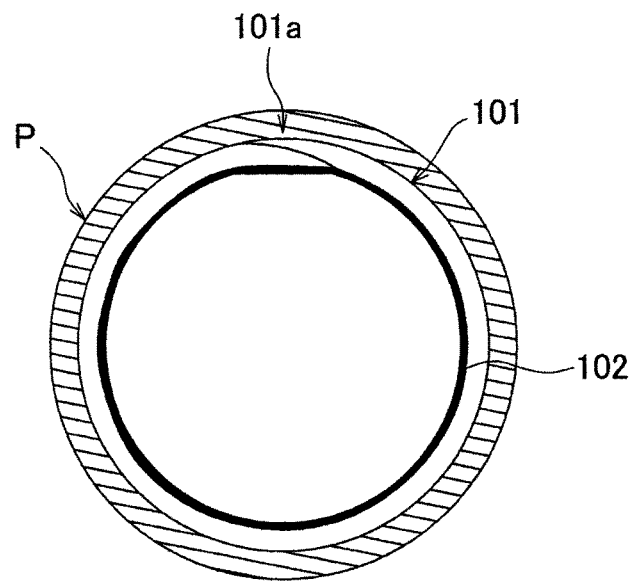
FIGS. 16A and 16B each is a diagram illustrating a known lining material installed in a conduit.
Figure 16B:
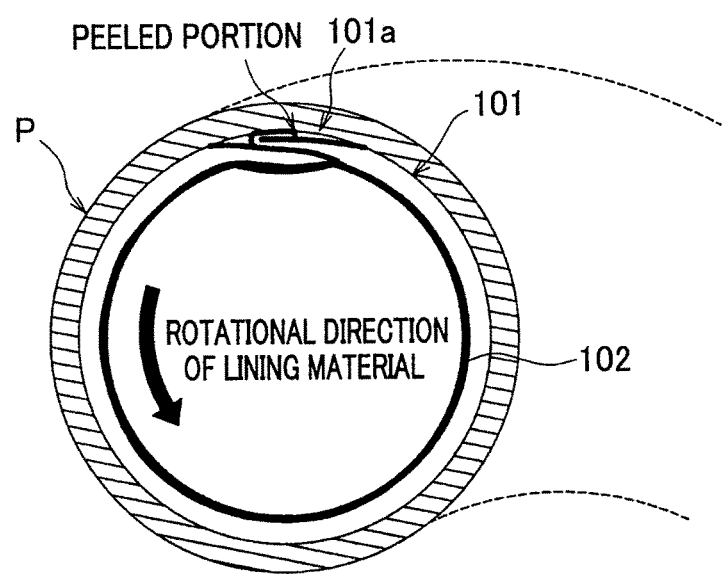
Figure 17A:
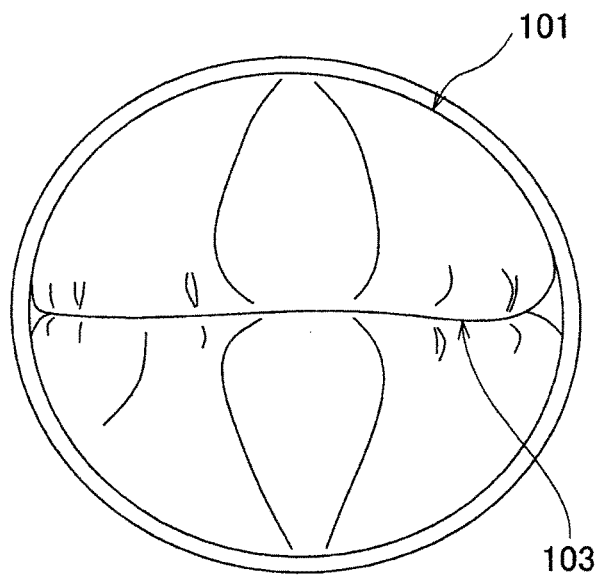
FIG. 17A illustrates an inversion leading end portion of a known lining material which is being inverted, viewed from the front with respect to the proceeding direction of the lining material.
Figure 17B:
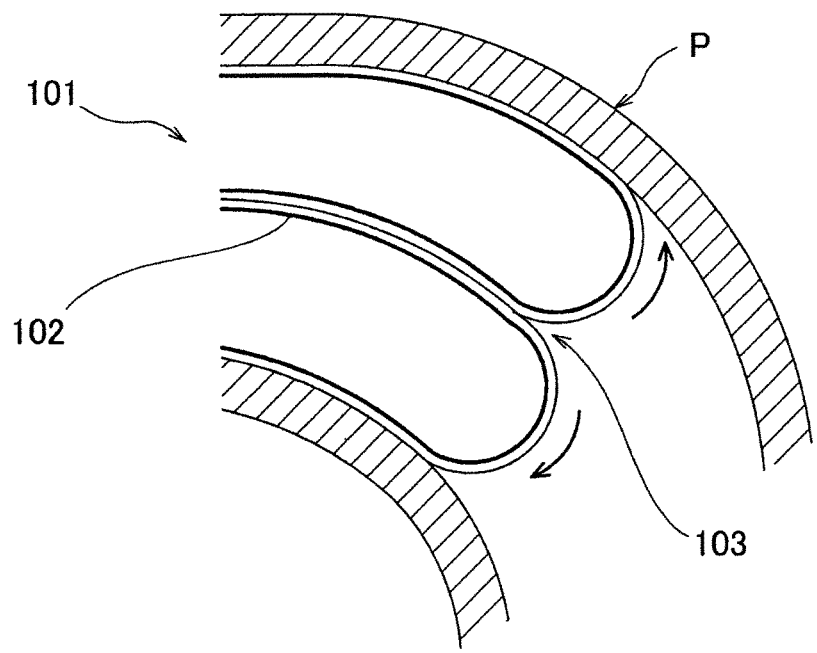
FIG. 17B is a longitudinal sectional view of a bending portion of a conduit in which the known lining material is being installed.

FIG. 15B illustrates the lining material main body 51 of FIG. 15A, turned upside down, in which the tubular member 8 is disposed on an inner surface of the lining material main body 51. Also in this case, it is preferable that the tubular member 8 is releasably jointed to the lining material main body 51 by the hot melt adhesive 9. In FIG. 15B, the hot melt adhesive 9 is applied to two portions to joint them.

In the above-described embodiment, the tubular member 8 is the tubular woven fabric; however, the tubular member 8 may be made from other material, for example, by a non-woven fabric. Further, the tubular member 8 is the woven fabric which has no seam in its axial direction; however, the tubular member 8 may have a seam in the axial direction, i.e., does not have to be seamless.

In the above-described embodiment, the liquid curable resin with which the lining material 1 is impregnated is a thermosetting resin. However, the liquid curable resin is not limited to this, and a UV curing resin or a cold setting resin may be used. However, in the case where lining is performed through the two steps of the installation step and the diameter expansion step as is in the above-described embodiment, it is preferable to use a liquid thermosetting resin so that curing of the liquid curable resin and softening of the hot melt adhesive 6 (release of the joint) can be conducted at the same time.

In the above-described embodiment, the both circumferential ends of the tubular lining material main body 2 are jointed to each other by the hot melt adhesive 6. However, the both ends may be jointed in another way, for example, by sewing. It should be noted that, if the both ends are jointed by sewing, the both ends have to be jointed relatively loosely so that a sewed portion can be torn when pressure is applied to the lining material main body 2 from inside in the diameter expansion step.

Further, it is not particularly necessary to joint the both circumferential ends of the lining material main body 2 to each other when there is no possibility that, due to high friction between the overlapping both circumferential ends, for example, the tubular lining material main body 2 significantly expands when the lining material 1 is installed in the conduit P.

In addition, inversion and diameter expansion may be performed at the same time, for example, in repairing of a water pipe or the like. In this case, the both circumferential ends of the tubular lining material main body 2 (the ends at the overlapping portion 2a) are jointed to each other by the hot melt adhesive 6 relatively weakly (for example, the usage of the hot melt adhesive 6 is reduced). Then, the joint is released by pressure applied for inversion, and thereby the overlapping ends are slid on each other. Thus, inversion and diameter expansion are performed simultaneously, and the lining material main body 2 is brought into close contact with the inner surface of the conduit P. With this simultaneous performance of inversion and diameter expansion to bring the lining material 1 into close contact with the conduit P, it is possible to prevent, for example, water entry from the outside of the existing pipe, which can cause the thermosetting resin to be insufficiently heated and thereby to be uncured. In addition, it is possible to expel forward water stagnant in the conduit P, in parallel with inversion and diameter expansion.

In the above-described embodiment, the tubular woven fabric 3 coated with the coating 7 is used as the impermeable layer. The impermeable layer is not limited to this, and a plastic tube with a relatively large thickness (on the order of 100 μm) may be alternatively used as the impermeable layer. In this case, it is possible to remove the impermeable layer after the conduit is lined.

The above-described embodiment deals with a case where the present invention is used to repair an existing conduit. However, the lining material may be installed to reinforce a conduit, irrespective of whether the conduit is existing or new.

The base material sheet 10 constituting the lining material main body 2 is not limited to that described in the above embodiment. The base material sheet 10 may be structured as follows.

In the base material sheet 10 of the above-described embodiment, the non-woven fabrics 4 are respectively laid on the both sides of each woven glass roving fabric 5, and each woven glass roving fabric 5 is sandwiched by two non-woven fabrics 4. However, the non-woven fabric 4 may be laid on only one of the both sides of each woven glass roving fabric 5. This structure also provides the effect of preventing yarn slippage in the woven glass roving fabric 5, or preventing raveling out at an edge.

Further, the woven fabric made of glass yarns is not limited to the woven glass roving fabric formed of the glass roving made of paralleled glass yarns. There may be used a glass fabric made by weaving twisted glass yarns.

The base material sheet does not have to have the lamination structure in which the woven fabric(s) made of glass yarns and the non-woven fabric(s) are laid on one another. For example, one or more of the non-woven fabrics 4 may be omitted. For instance, the non-woven fabrics 4 and the woven glass roving fabrics 5 do not have to be alternately laid on one another. The non-woven fabrics 4 may be respectively laid only on upper and lower sides of a stack of the woven glass roving fabrics 5. Alternatively, no non-woven fabric 4 may be provided. Further, the reinforced fiber layer of the lining material does not have to be the woven fabric of the glass yarns. For example, the base material sheet may be sheet molding compound (SMC) in which high-strength short fibers are dispersed in a liquid thermosetting resin.

Furthermore, the base material sheet includes the glass yarns which are high-strength fibers; however, the base material sheet may include high-strength fibers other than the glass yarns, such as aramid fibers, high-strength polyethylene fibers and high-strength polyallylate fibers.

REFERENCE SIGNS LIST

1 lining material
2, 51 lining material main body
2a, 51a, 51b overlapping portion
3 tubular woven fabric (impermeable layer)
4 non-woven fabric
5 woven glass roving fabric
6 hot melt adhesive
7 coating
8 tubular member
10, 52 base material sheet
A slack portion
P conduit

The invention claimed is:

1. A lining material for a conduit, the lining material being inverted to be inside out to line the conduit, the lining material comprising:
   a tubular impermeable layer,
   a lining material main body provided inside the impermeable layer, the lining material main body made into a tubular form by rolling a base material sheet, the lining material main body having an overlapping portion where both circumferential ends of the lining material main body overlap each other; and
   a tubular member provided inside the lining material main body,
   wherein a diameter of the tubular member is larger than a diameter of the lining material main body,
   wherein, when the tubular member is squashed to be substantially flat, the tubular member has two sides including an outer side that contacts the overlapping portion and an inner side that does not contact the overlapping portion, and the tubular member includes a slack portion or a folded portion, and
   wherein the slack portion or the folded portion is on the inner side of the tubular member, and does not contact the overlapping portion.

2. The lining material according to claim 1, wherein the lining material main body and the tubular member are releasably jointed to each other.

3. The lining material according to claim 2, wherein inside the lining material main body, the tubular member is releasably jointed to an inner surface of an overlapping portion where both circumferential ends of the lining material main body overlap each other.

4. The lining material according to claim 1, wherein the tubular member is a tubular woven fabric.

5. The lining material according to claim 4, wherein the tubular woven fabric has no seam in an axial direction of the tubular woven fabric.

6. The lining material according to claim 1, wherein the impermeable layer includes a tubular woven fabric which is woven from synthetic yarns, an outer surface of the tubular woven fabric being coated with a coating of a thermoplastic resin.

7. A method for lining a conduit having a bending portion, the method comprising:
   impregnating the lining material recited in claim 1 with a curable resin; and
   subsequently inverting the lining material to line the conduit.

8. The lining material according to claim 1, wherein the circumferential ends of the lining material main body are joined via an adhesive to form the overlapping portion.

9. The lining material according to claim 8, wherein the adhesive is a hot melt adhesive.

10. The lining material according to claim 8, wherein the adhesive is positioned in a plurality of parallel elongate regions.

\* \* \* \* \*